(12) United States Patent
Labate

(10) Patent No.: US 11,389,733 B1
(45) Date of Patent: Jul. 19, 2022

(54) MATCHMAKING FOR ONLINE GAMING WITH PRIVACY COMPLIANT CONNECTIVITY PREDICTION

(71) Applicant: Electronic Arts Inc., Redwood City, CA (US)

(72) Inventor: Jesse Alan Labate, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/248,380

(22) Filed: Jan. 22, 2021

(51) Int. Cl.
A63F 13/35 (2014.01)
A63F 13/795 (2014.01)

(52) U.S. Cl.
CPC ............ A63F 13/795 (2014.09); A63F 13/35 (2014.09)

(58) Field of Classification Search
CPC ...... A63F 13/795; A63F 13/35; H04W 36/30; H04W 88/06
USPC .......................................................... 463/42
See application file for complete search history.

(56) References Cited

U.S. PATENT DOCUMENTS

| 9,209,985 | B1 * | 12/2015 | Wise ..................... H04L 41/147 |
| 2013/0308468 | A1 * | 11/2013 | Cowie .................... H04L 45/04 370/248 |
| 2015/0245167 | A1 * | 8/2015 | Bobrow ................ H04W 8/005 455/41.2 |
| 2015/0319063 | A1 * | 11/2015 | Zourzouvillys ......... H04L 65/80 370/352 |
| 2017/0289591 | A1 * | 10/2017 | Blohowiak ........ H04N 21/4532 |
| 2018/0189226 | A1 * | 7/2018 | Hofverberg .............. G06N 5/02 |
| 2019/0319868 | A1 * | 10/2019 | Svennebring ......... H04W 24/08 |
| 2020/0273000 | A1 * | 8/2020 | Li .......................... G06Q 10/04 |
| 2020/0314729 | A1 * | 10/2020 | Kwok ................... H04W 28/08 |
| 2020/0366732 | A1 * | 11/2020 | Trang .................... H04L 67/101 |
| 2021/0045040 | A1 * | 2/2021 | Panje .................... H04W 36/22 |
| 2021/0045052 | A1 * | 2/2021 | Nellore ................ H04W 48/20 |
| 2022/0007253 | A1 * | 1/2022 | Albero ................ H04L 43/0811 |

* cited by examiner

*Primary Examiner* — Michael A Cuff
(74) *Attorney, Agent, or Firm* — Lee & Hayes, P.C.

(57) ABSTRACT

A matchmaking system matches players for online gaming using privacy compliant connectivity prediction between the players being matched. The matchmaking system may receive historical data relating to network connections between a first respective internet service provider (ISP) of a first player device of a first player and one or more of a hosting system or a second respective ISP of a second device of a second player and determine, based at least in part on the historical data, a predicted connectivity between one or more of the first respective ISP and the second respective ISP, the first respective ISP and the hosting system, or the second respective ISP and the hosting system. Then, based at least in part on the predicted connectivity, the matchmaking system may instantiate an online game between at least the first device of the first player and the second device of the second player.

20 Claims, 4 Drawing Sheets

MATCHMAKING FOR ONLINE GAMING WITH PRIVACY COMPLIANT CONNECTIVITY PREDICTION

BACKGROUND

Online gaming allows for players to play a variety of electronic and/or video games with each other via network connectivity, such as via the Internet. Users who wish to play a game may be matched with each other to play the game, even though those players may be remotely located from each other. Online gaming may be enabled by gaming system(s) to which each of the players may connect using client devices. In online gaming, frustration may arise from failures to find, or delays in finding, suitable matches with other players.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
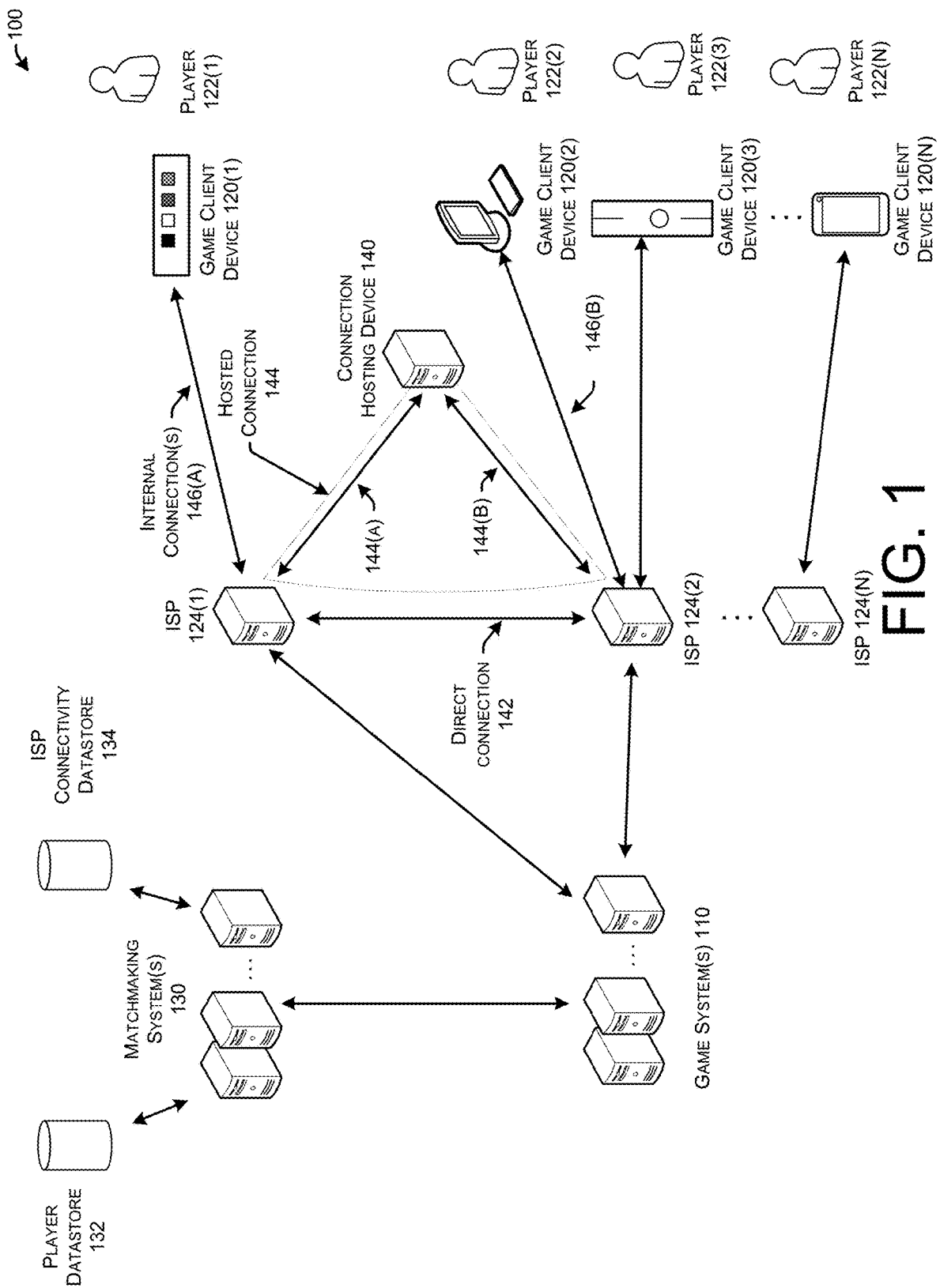
FIG. 1 illustrates a schematic diagram of an example environment with game system(s) and game client device(s) that may enable online gaming, in accordance with example embodiments of the disclosure.

Example embodiments of this disclosure describe methods, apparatuses, computer-readable media, and system(s) for matching players for online gaming based on predicted connectivity and/or for preserving resources by predicting a benefit from utilizing a hosted connection between players. In example embodiments of the disclosure, players who play an online game may be matched with each other in accordance with the disclosure herein.

For online games, a suitable opponent or teammate for a player attempting to matchmake may be determined based on, for example, user location, latency or connection quality, etc. Examples according to this disclosure may improve matchmaking by filtering out pairs/groups of players likely to have unsatisfactory connection quality and/or utilizing a predicted connectivity in matching players.

More particularly, examples according to this disclosure may improve matchmaking using privacy compliant connectivity prediction between the players being matched. For example, privacy regulations such as the General Data Protection Regulation (GDPR) may consider network details such as an individual player's IP address as personally identifiable information (PII) and may discourage or prohibit storage and/or retention of PII. As such, examples according to this disclosure may provide for connectivity prediction without the storage and/or retention of such PII. It should be noted that while some examples do not store or retain PII, other examples may retain and utilize at least some PII and what information may qualify as PII may vary from jurisdiction to jurisdiction.

Instead of or in addition to storing and utilizing PII such as data on historical latency between player IP addresses, some examples may store historical data on connectivity (e.g., latency) of player ISPs or autonomous systems (ASs) (ISPs and ASs are referred to herein collectively as ISPs for simplicity) with game systems (e.g., datacenters of the game systems) and/or other ISPs. Information regarding connectivity of player ISPs may not qualify as PII. For example, storing data regarding the IP addresses of the ISPs may not be consider storing PII of the players as the IP addresses of the ISPs are tied to network infrastructure and/or company resources, not an individual.

Some examples may collect network connection data such as latency information for players during gameplay or other interactions. When collecting the network connection data between the players and the game system, the matchmaking system may separate the network connection data into internal network connection data (e.g., inside the ISP) and external network connection data (e.g., between the ISP and the game system). For example, when collecting latency samples between the players and the game system, the matchmaking system may separate the latency into components that represent latency internal to the ISP and latency external to the ISP. Similarly, when players are matched in a game that operates over a direct connection between the players' game client devices, the game client devices may collect network connection data such as latency information for the direct connection and provide the collected data to the matchmaking system. The matchmaking system may separate the network connection data for the direct connection into internal network connection data (e.g., inside the ISP) and external network connection data (e.g., between the ISPs). For example, when processing latency samples between the players over a direct connection, the matchmaking system may separate the latency into components that represent latency internal to the first ISP, latency internal to the second ISP, and latency external to and between the first ISP and the second ISP.

The network connection data regarding the components of the connections external to the ISPs may be processed and stored in an ISP connectivity datastore for use in future matchmaking. In addition or alternatively, the network connection data (both privacy compliant and non-compliant) may be processed into privacy compliant data and stored the ISP connectivity datastore for use in future matchmaking.

In some examples, when evaluating players in matchmaking for a game over a direct connection, the players' internal ISP latencies can be requested from the game client devices of the player and combined with the stored expectation of latency between their two ISPs to predict a likely total latency without requiring retention of PII. Similarly, when evaluating players in matchmaking for a hosted game over a hosted connection or for a hosted online game between more than two players, the players' internal ISP latencies can be combined with the stored predicted latency between player ISPs and the game system or connection hosting device that may host the hosted connection to predict a likely total latency without requiring retention of PII. It should be noted that, although examples discussed herein may combine the predicted latency between the player ISPs, the game system(s) and/or the connection hosting device(s) with the players' internal ISP latencies, other examples may utilize the predicted latency without the players' internal ISP latencies.

While the discussion herein may relate to collecting, processing, storing and utilizing external network connection data (e.g., data regarding the components of the network connection that are external to the player's ISP), implementations are not limited to network connection data external to the player's ISP. For example, privacy-compliant connectivity prediction operations may also collect and store network connection data internal to the player's ISP but not so specific to the player as to make the player potentially identifiable. For example, the privacy-compliant connectivity prediction operations may also generate connectivity data regarding nodes in the ISP's network. Such information may be obtained, for example, using a traceroute or similar function. In a first example, the privacy-compliant connectivity prediction operations may collect, process and store a component of the network connection data that may represent a portion of the connection from the edge of the ISP network to the game client device (e.g., from the edge to an IP address two hops from the IP address associated with the game client device). In a second example, the privacy-compliant connectivity prediction operations may collect and process a component of the network connection data that may represent a portion of the connection from the edge of the ISP network to the game client device and aggregate the resulting internal network connection data based on a geographical region (e.g., regions that are a number of square miles in size, zip codes, cities or nearest cities, etc.) while removing identifying information such as the player's IP address.

In some examples, players who wish to play an online game may be matched to each other by one or more matchmaking system(s) based at least in part on the predicted connectivity between the players and matchmaking factors associated with each of the players. Some example matchmaking factors may be related to behavior and may include playstyle, skill score, and so on. Some matchmaking factors may be character or setup related such as character class, team choice, position or role preference, and so on. Other matchmaking factors may be related to regular teammates of the players.

In some examples, the matchmaking system(s) may filter out players from potential matches if the predicted connectivity between the players does not meet a predetermined threshold. The matchmaking may then continue for the remaining potential matches based on the matchmaking factors.

In other examples, the matchmaking system(s) may consider the predicted connectivity between the players along with the matchmaking factors in determining matches, with the weight given to the predicted connectivity varying. As such, some examples may not utilize the predicted connectivity as a hard constraint on selecting matches. Other examples may initially utilize the predicted connectivity as a hard constraint but relax the constraint should suitable matches not be available. Still other examples may utilize the predicted connectivity to filter out potential matches, then utilize the predicted connectivity as a factor in determining matches from among the remaining potential matches. These and other variation would be apparent in view of this disclosure.

While the discussion herein may utilize latency as an example connectivity datum, implementations are not limited to latency. For example, the network connection data and predicted connectivity may include ping, connection stability, throughput, packet loss, occurrence of games that ended due to failed connections, and so on.

Additionally, as mentioned above, some examples according to this disclosure may preserve system resources by predicting a benefit from utilizing a hosted connection between players. A hosted connection may provide improved latency over allowing players to connect directly due to network conditions or business decisions of their individual IP addresses and/or internet service providers (ISPs). However, a hosted connection may require additional resources to be expended by gaming system(s) or the operator(s) of the gaming system(s). By predicting which players are likely to receive a connection quality improvement with a hosted connection, the examples according to this disclosure may preserve those resources for the most impacted players/connections. More particularly, using the privacy-compliant connectivity prediction discussed above, examples according to this disclosure may determine the expected connectivity between players. Additionally, examples according to this disclosure may compute the predicted connectivity for the connection between players if the connection were routed through hosted connectivity. If an expected improvement (e.g., the difference in predicted connectivity between the direct connection and the hosted connection) exceeds a predetermined threshold, the clients can be instructed to use the hosted connectivity resource as a first option.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with game system(s) 110 and game client device(s) 120 that enable online gaming, in accordance with example embodiments of the disclosure.

The example environment 100 may include one or more player(s) 122(1), 122(2), 122(3), . . . 122(N), hereinafter referred to individually or collectively as player(s) 122, who may interact with respective game client device(s) 120(1), 120(2), 120(3), . . . 120(N), hereinafter referred to individually or collectively as game client device(s) 120 via respective input device(s). The game client device(s) 120 may connect to the game system(s) 110 via internet service providers (ISPs) 124(1), 124(2), . . . 124(N), hereinafter referred to individually or collectively as ISPs 124.

The game client device(s) 120 may receive game state information from the one or more game system(s) 110 that may host the online game played by the player(s) 122 of environment 100. The game state information may be received repeatedly and/or continuously and/or as events of the online game transpire. The game state information may be based at least in part on the interactions that each of the player(s) 122 have in response to events of the online game hosted by the game system(s) 110.

The game client devices 120 may be configured to render content associated with the online game to respective players 122 based at least on the game state information. More particularly, the game client device(s) 120 may use the most recent game state information to render current events of the online game as content. This content may include video, audio, haptic, combinations thereof, or the like content components.

As events transpire in the online game, the game system(s) 110 may update game state information and send that game state information to the game client device(s) 120. For example, if the players 122 are playing an online soccer game, and the player 122 playing one of the goalies moves in a particular direction, then that movement and/or goalie location may be represented in the game state information that may be sent to each of the game client device(s) 120 for rendering the event of the goalie moving in the particular direction. In this way, the content of the online game is repeatedly updated throughout game play.

When the game client device(s) 120 receive the game state information from the game system(s) 110, a game client device 120 may render updated content associated with the online game to its respective player 122. This updated content may embody events that may have transpired since the previous state of the game (e.g., the movement of the goalie).

The game client device(s) 120 may accept input from respective players 122 via respective input device(s). The input from the players 122 may be responsive to events in the online game. For example, in an online basketball game, if a player 122 sees an event in the rendered content, such as an opposing team's guard blocking the point, the player 122 may use his/her input device to try to shoot a three-pointer. The intended action by the player 122, as captured via his/her input device, may be received by the game client device 120 and sent to the game system(s) 110.

The game client device(s) 120 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 120 may execute programs thereon to interact with the game system(s) 110 and render game content based at least in part on game state information received from the game system(s) 110. Additionally, the game client device(s) 120 may send indications of player input to the game system(s) 110. Game state information and player input information may be shared between the game client device(s) 120 and the game system(s) 110 using any suitable mechanism, such as application program interfaces (APIs).

The game system(s) 110 may receive inputs from various player(s) 122 and update the state of the online game based thereon. As the state of the online game is updated, the state may be sent to the game client device(s) 120 for rendering online game content to players 122. In this way, the game system(s) 110 may host the online game.

In some examples, similar operations to performed above by the game system(s) 110 to host the online game may instead be performed by the game client device(s) 120 (e.g., in the case of a direct connection 142) or performed by a connection hosting device 140 (e.g., in the case of a hosted connection 144 by a device separate from the game system(s) 110). More particularly, in the case of a direct connection, game state information sent to and received from the game system(s) 110 as well as the operations performed by the game system(s) 110 to host the online game may instead be transmitted between the game client device(s) 120 via their respective ISPs 124 and/or performed by the game client device(s) 120. Similarly, in the case of a hosted connection outside of the game system(s) 110, the game state information sent to and received from the game system(s) 110 as well as the operations performed by the game system(s) 110 to host the online game may instead be transmitted between the game client device(s) 120 via their respective ISPs 124 and the connection hosting device 140 and/or performed by the game client device(s) 120.

The example environment 100 may further include matchmaking system(s) 130 to match players 122 who wish to play the same game and/or game mode with each other. The matchmaking system(s) 130 may receive an indication from the game system(s) 110 of players 122 who wish to play an online game.

The matchmaking system(s) 130 may access information about the player(s) 122 who wish to play a particular online game, such as from a player datastore 132. A user account for each of the players 122 may associate various information about the respective players 122 and may be stored in the player datastore 132 and accessed by the matchmaking system(s) 130.

The matchmaking system(s) 130 may also ascertain the ISPs of the players 122 who wish to play an online game. The matchmaking system(s) 130 may access network connection data regarding connections between different player ISPs and between the player ISPs and the game system(s) 110 and/or separate connection hosting device(s) 140, if any.

As discussed above, the matchmaking system(s) 130 may improve matchmaking using privacy compliant connectivity prediction between the players being matched. In particular, the matchmaking system(s) 130 may determine and store historical data on connectivity (e.g., latency) between player ISPs with game systems (e.g., datacenters of the game system(s) 110), connection hosting devices 140 and/or other ISPs in the ISP connectivity datastore 134. As mentioned above, information regarding connectivity of player ISPs and connectivity of the network infrastructure of the player ISPs may not qualify as PII.

In some examples, the matchmaking system(s) 130 may request and/or collect network connection data such as latency information for players during gameplay or other interactions. In some examples, the devices or systems collecting the connection data may provide the matchmaking system(s) 130 with data that is privacy compliant. In other examples, the matchmaking system(s) 130 may separate the data that is privacy compliant from non-privacy compliant data.

The external system or device collecting the data (e.g., one or more of the game system(s) 110, the game client device(s) 120, the connection hosting device 140 or matchmaking system(s) 130) may separate the network connection data into internal network connection data (e.g., inside the player ISP(s)) and external network connection data (e.g., between ISP(s) and other ISPs and between ISPs and external system(s)). For example, when collecting latency samples between the game client devices 120 and an external system, the external system may separate the latency into components that represent latency internal to the player ISPs 124 and latency external to the ISPs 124. For example, when processing latency samples between the game client devices 120(1) and 120(2) over a hosted connection 144, the matchmaking system(s) 130 may separate the latency into components that represent latency internal to the first ISP 124(1) (e.g., over internal connection 146(A)), latency internal to the second ISP 124(2) (e.g., over internal connection 146 (B)), and latency external to and between the first ISP 124(1) and the second ISP 124(2) (e.g., over hosted connection 144(A) and over hosted connection 144 (B) via the connection hosting device 140).

Similarly, when players are matched in a game that operates over a direct connection 142 between the players' game client devices 120, the game client devices 120 may collect network connection data such as latency information for the direct connection 142 and provide the collected data to the matchmaking system(s) 130. The matchmaking system(s) 130 may separate the network connection data for the direct connection 142 into internal network connection data (e.g., inside the players ISP 124) and external network connection data (e.g., between the ISPs 124 over the direct connection). For example, when processing latency samples between the game client devices 120(1) and 120(2) over a direct connection 142, the matchmaking system(s) 130 may separate the latency into components that represent latency internal to the first ISP 124(1), latency internal to the second ISP 124(2), and latency external to and between the first ISP 124(1) and the second ISP 124(2) (e.g., over the direct connection 142).

The network connection data regarding the components of the connections external to the ISPs may be processed and stored in the ISP connectivity datastore 134 for use in future matchmaking. In addition or alternatively, the network connection data (both privacy compliant and non-compliant) may be processed into privacy compliant data and stored in the ISP connectivity datastore 134 for use in future matchmaking.

In some examples, when performing matching for a direct connection, the players' internal ISP latencies can be requested from the game client devices and combined with a stored predicted latency between the two player ISPs to predict a likely total latency without requiring retention of PII. Similarly, when evaluating players in matchmaking for a hosted game over a hosted connection or for a hosted online game via the game system(s) 110, the players' internal ISP latencies can be combined with the stored predicted latency between player ISPs and the game system(s) 110 or connection hosting device 140 that may host the hosted connection 144 to predict a likely total latency without requiring retention of PII. It should be noted that, although examples discussed herein may combine the predicted latency between the player ISPs, the game system(s) 110 and/or the connection hosting device(s) 140 with the players' internal ISP latencies, other examples may utilize the predicted external latency without the players' internal ISP latencies.

While the discussion herein may relate to the matchmaking system(s) 130 collecting, processing, storing and utilizing external network connection data (e.g., data regarding the components of the network connection that are external to the player's ISP), implementations are not limited to network connection data external to the player's ISP. For example, the matchmaking system(s) 130 may also collect and store network connection data internal to the player's ISP 124 but not so specific to the player as to make the player potentially identifiable. For example, the matchmaking system(s) 130 may also generate connectivity data regarding nodes in the ISPs 124. Such information may be obtained, for example, using a traceroute or similar function. In a first example, the matchmaking system(s) 130 may collect, process and store a component of the network connection data that may represent a portion of the connection from the edge of the ISP 124 to the game client device 120 (e.g., from the edge to an IP two hops from the IP associated with the game client device 120). In a second example, the matchmaking system(s) 130 may collect and process a component of the network connection data that may represent the connection from the edge of the ISP 124 to the game client device 120 and aggregate the resulting internal network connection data based on a geographical region (e.g., regions that are a number of square miles in size, zip codes, cities or nearest cities, etc.). Other variations would be apparent to one of skill in the art in view of this disclosure.

In some examples, players 122 who wish to play an online game may be matched to each other by one or more matchmaking system(s) 130 based at least in part on the predicted connectivity between the game client devices 120 of the players and matchmaking factors associated with each of the players.

In some examples, the matchmaking system(s) 130 may filter out players from potential matches if the predicted connectivity between the game client devices 120 does not meet a predetermined threshold. The matchmaking system(s) 130 may then continue matchmaking for the remaining potential matches based on the matchmaking factors.

In other examples, the matchmaking system(s) 130 may consider the predicted connectivity between the players 122 along with the matchmaking factors in determining matches, with the weight given to the predicted connectivity varying. As such, some examples may not utilize the predicted connectivity as a hard constraint on selecting matches. Other examples may initially utilize the predicted connectivity as a hard constraint but relax the constraint should suitable matches not be available. Still other examples may utilize the predicted connectivity to filter out potential matches, then utilize the predicted connectivity as a factor in determining matches from among the remaining potential matches. These and other variation would be apparent in view of this disclosure.

While the discussion herein may utilize latency as an example connectivity datum, implementations are not limited to latency. For example, the network connection data and predicted connectivity may include ping, connection stability, throughput, packet loss, occurrence of games that ended due to failed connections, and so on.

As mentioned above, the matchmaking system(s) 130 may also match player(s) 122 according to one or more factors associated with the player(s) 122, such as skill at a particular game.

In a skill score based matchmaking example, when a plurality of players 122 wish to play an online game, the online game may be formed by matching players 122 with relatively similar skill scores. A player's skill score in a particular game may be an estimate of a player's expected performance in that game based at least in part on historic game performance data. A player who exhibits a relatively higher level of skill compared to another player may have a higher skill score than the other player. By enabling games with players of relatively similar skill scores, and therefore relatively similar skill levels, a more enjoyable game may be achieved for the players than if there is a relatively high disparity in the skill scores and/or skill levels of the players.

Once the matchmaking system(s) 130 has accessed the player skill scores, the matchmaking system(s) 130 may be configured to match player(s) 122 based at least in part on their respective skill scores. In addition to or alternatively to skill scores, players 122 may be matched on a variety of other factors.

Some example matchmaking factors may be related to behavior in addition to skill and may include a player's playstyle. For example, when matching player(s) 122 as a team for a team deathmatch, the matchmaking system(s) 130 may favor matching player(s) 122 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. In another example, when matching player(s) 122 as a team for a team-based sports game (e.g., an online team based American football game), the matchmaking system(s) 130 may favor matching player(s) 122 based on whether the players employ strategies consistent with real-life football games (e.g., kicking extra points or attempting a two point conversion according to the situation) in the online game or employ overly aggressive, fanciful, or unrealistic strategies inconsistent with real-life football games (e.g., always attempting the two point conversion or attempting to convert every fourth down). Many other aspects of players' playstyles may be utilized in matchmaking. The aspects of players' playstyle utilized for different genres or different individual games may vary from example to example.

Some example matchmaking factors may be character or setup related such as character class, team choice, position or role preference, and so on. For example, when matching player(s) 122 for an online roleplaying game, the matchmaking system(s) 130 may consider the character classes of the player(s) 122. In such examples, the aspects of the playstyles of the player(s) 122 utilized in matchmaking may be specific to the character or setup related factors for a slot in the matchmaking that is to be filled. The character or setup related factors of players 122 may be determined by the settings or character selected by the individual players 122 when requesting matchmaking.

Other matchmaking factors may be related to teammates or teams of the players 122. In an example, the matchmaking may match a player 122 with teammates the player plays with regularly. In this way, the teammates may behave in a more expected manner from the perspective of the player 122.

Having matched the player(s) 122, the matchmaking system(s) 130 may trigger and instruct generation of instance(s) of the online game(s) for the match(es). More particularly, the matchmaking system(s) 130 may request the game system(s) 110 or game client device(s) 120 instantiate an online game between the matched players 122. For example, the matchmaking system(s) 130 may provide connection information for the game client device(s) 120 and/or the connection hosting device(s) 140 to the game system(s) 110 for instantiation of one or more instances of the game between the matched players 122 using direct connection(s) 142 and or hosted connection(s) 144.

Further, as the players 122 engage in additional gameplay, the gaming system(s) 110, game client device(s) and/or connection hosting device(s) 140 may provide the matchmaking system(s) 130 with additional network connection data. The matchmaking system(s) 130 may update the network connection data stored in the ISP connectivity datastore 134 based on the additional network connection data. In this manner, the network connection data of the ISPs upon which matching is based may evolve over time.

In addition or alternatively, as mentioned above, some examples may preserve system resources by predicting a benefit from utilizing a hosted connection between players. A hosted connection may provide improved latency over allowing players to connect directly due to network conditions or business decisions of their individual IP addresses and/or internet service providers (ISPs). However, a hosted connection may require additional resources to be expended by gaming system(s) or the operator(s) of the gaming system(s). By predicting which players are likely to receive a connection quality improvement with a hosted connection, some examples may preserve those resources for the most impacted players and/or connections. More particularly, using the privacy-compliant connectivity prediction discussed above, examples according to this disclosure may determine the expected connectivity for a direct connection 142 between game client devices 120. Additionally, examples according to this disclosure may compute the predicted connectivity for a hosted connection 144 between game client devices 120 if the connection were routed through the game system(s) 110 or connection hosting device(s) 140. If an expected improvement (e.g., the difference in predicted connectivity between the direct connection 142 and the hosted connection 144) exceeds a predetermined threshold, the game client devices may be instructed to use a hosted connection 144 as a first option. Otherwise, the game client devices may be instructed to use a direct connection 144 as a first option.

The first option may then be tested or verified to ensure the connection performs as predicted. If so, the game client device(s) 120 and/or game system(s) 110 may be instructed to initialize the game using the first option. Otherwise, the game client devices may be instructed to establish a connection of the other connection type. The connection of the other connection type may then be tested. Then, the game client device(s) 120 and/or game system(s) 110 may be instructed to initialize the game using the connection type that performed best.

Though example implementation details are discussed above, variations are possible. For example, other implementations may include game streaming services. In such an example, the ISP connectivity database 152 may further store information about connectivity of player ISPs to the streaming system(s). Other variations would be apparent in view of this disclosure.

Figure 2:
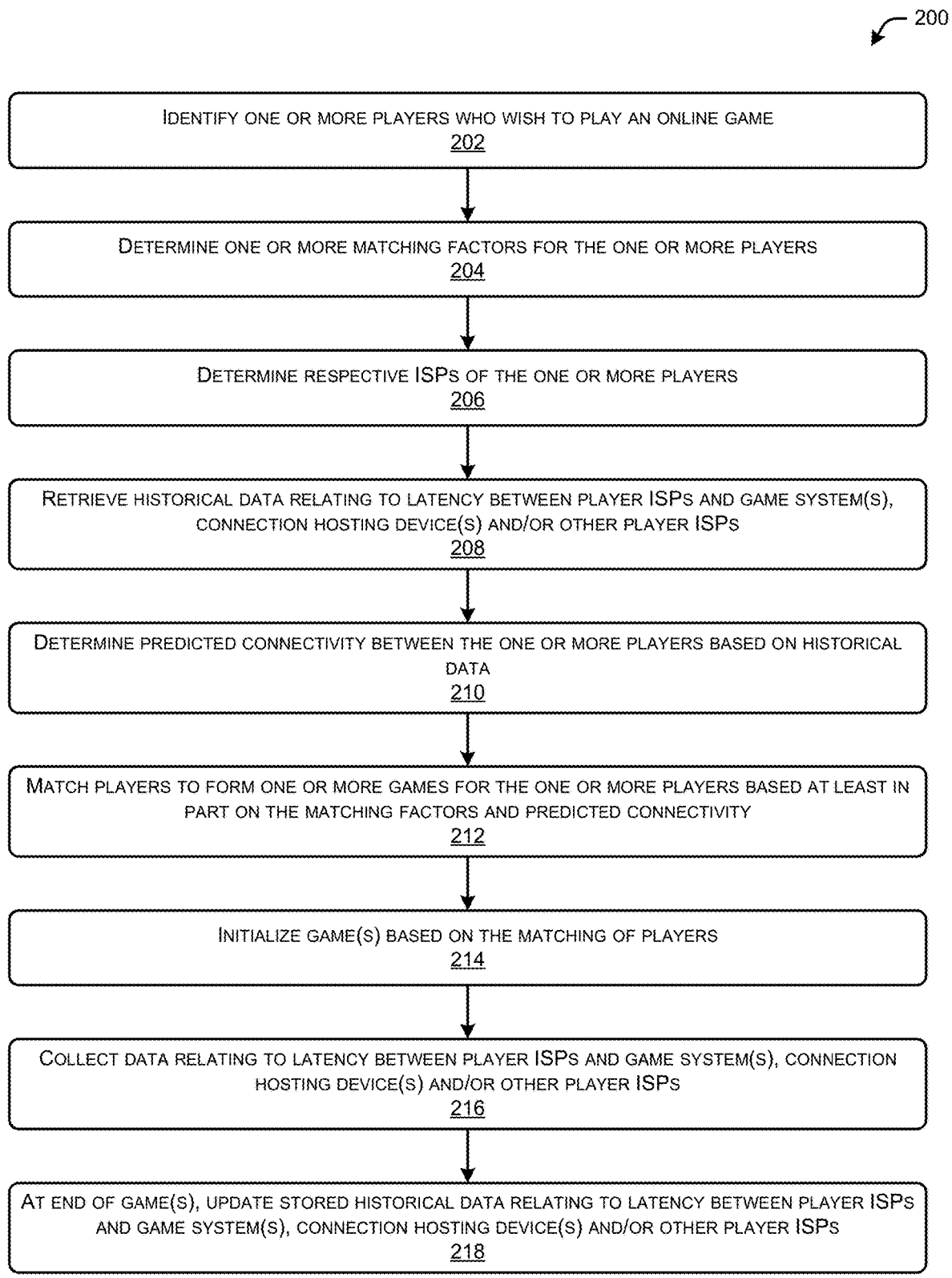
FIG. 2 illustrates a flow diagram of an example method that may provide matchmaking using privacy compliant connectivity prediction between the players being matched, in accordance with example embodiments of the disclosure.

FIG. 2 illustrates a flow diagram of an example method 200 to provide matchmaking using privacy compliant connectivity prediction between the players being matched, in accordance with example embodiments of the disclosure. The method 200 may be performed by the matchmaking system(s) 130, individually or in cooperation with one or more other elements of the environment 100. Method 200 may be performed, for example, based on the details discussed above with regard to FIG. 1.

At block 202, one or more player(s) 122 who wish to play an online game may be identified. The one or more player(s) 122 may be identified by the matchmaking system(s) 130 based at least in part on a message and/or an indication from the game system(s) 110 and/or game client device(s) 120 that the one or more player(s) 122 wish to play the online game. In other cases, the matchmaking system(s) 130 may repeatedly access a shared list and/or database that provides information about players 122 who wish to join different online games.

At block 204, the matchmaking system(s) 130 may determine one or more matching factors for the one or more players 122. For example, a skill score for each of the one or more players 122 may be determined by accessing a player datastore 132 and using a player identifier for each of the players 122 to access the respective skill scores for the player(s) 122.

At block 206, the matchmaking system(s) 130 may determine respective ISPs 124 of the one or more players 122. At block 208, the matchmaking system(s) 130 may retrieve historical data from the ISP connectivity datastore 134 relating to latency for connections between the player ISPs 124 and the game system(s) 110, the connection hosting device(s) 140 and/or the other player ISPs. The matchmaking system(s) 130 may then determine predicted connectivity between the one or more players 122 for various connection types (e.g., direct connections, hosted connections, etc.) based on the retrieved historical data at 210. As discussed above, the retrieved historical data may be combined with current data related to latency within the player ISPs 124 to estimate total latencies that may be utilized as predicted connectivity.

At block 212, the matchmaking system(s) 130 may match players to form one or more games for the one or more players based at least in part on the predicted connectivity and the matching factors. As discussed above, the predicted connectivity may be used as one or more of a filter on potential matches and a factor considered along with the other matching factors in combination.

At block 214, the one or more instances of the game(s) may be initialized based on the completed matchups. For example, having matched the player(s) 122, the matchmaking system(s) 130 may trigger and instruct generation of instance(s) of the online game(s) for the match(es) by one or more of the game system(s) 110, the game client device(s) and/or connection hosting device(s) 140. For example, the matchmaking system(s) 130 may provide connection information for the game client device(s) 120 of two or more matched players 122 to the game system(s) 110 and request the game system(s) 110 instantiate an online game between the two or more matched players 122.

The matchmaking system(s) 130 may collect data relating to latency between player ISPs 124 and the game system(s) 110, the game client device(s) 120, the connection hosting device(s) 140 and/or other player ISP(s) 124 during the one or more instance(s) of the game(s).

In some examples, the devices or systems collecting the connection data may provide the matchmaking system(s) 130 with data that is privacy compliant. More particularly, the external system or device collecting the data (e.g., one or more of the game system(s) 110, the game client device(s) 120, and the connection hosting device 140) may separate the network connection data into internal network connection data (e.g., inside the player ISP(s)) and external network connection data (e.g., between the ISP(s) and external system). For example, when collecting latency samples between the game client devices 120 and the game system(s) 110 or connection hosting device(s) 140, the external system may separate the latency into components that represent latency internal to the player ISPs 124 and latency external to the ISPs 124. For example, when processing latency samples between the game client devices 120(1) and 120(2) over a hosted connection 144, the matchmaking system(s) 130 may separate the latency into components that represent latency internal to the first ISP 124(1) (e.g., over internal connection 146(A)), latency internal to the second ISP 124(2) (e.g., over internal connection 146(B)), and latency external to and between the first ISP 124(1) and the second ISP 124(2) (e.g., over hosted connection 144(A) and over hosted connection 144 (B) via the connection hosting device 140).

Similarly, when players are matched in a game that operates over a direct connection 142 between the players' game client devices 120, the game client devices 120 may collect network connection data such as latency information for the direct connection 142 and provide the collected data to the matchmaking system(s) 130. The matchmaking system(s) 130 may separate the network connection data for the direct connection 142 into internal network connection data (e.g., inside the players ISP 124) and external network connection data (e.g., between the ISPs 124 over the direct connection). For example, when processing latency samples between the game client devices 120(1) and 120(2) over a direct connection 142, the game system may separate the latency into components that represent latency internal to the first ISP 124(1), latency internal to the second ISP 124(2), and latency external to and between the first ISP 124(1) and the second ISP 124(2) (e.g., over the direct connection 142).

At block 218, at the end of the game(s), the matchmaking system(s) 130 may update the stored historical data relating to latency between player ISPs and game system(s), connection hosting device(s) and/or other player ISPs. For example, the matchmaking system(s) 130 may determine and store data on connectivity (e.g., latency) between player ISPs and game system(s) 110 (e.g., datacenters of the game system(s) 110), connection hosting device(s) 140 and/or other player ISPs 124 in the ISP connectivity datastore 134. As mentioned above, information regarding connectivity of player ISPs and connectivity of the network infrastructure of the player ISPs may not qualify as PII.

In some examples, the network connection data regarding the components of the connections external to the ISPs may be processed and stored in the ISP connectivity datastore 134 for use in future matchmaking. In addition or alternatively, the network connection data (both privacy compliant and non-compliant) may be processed into privacy compliant data and stored the ISP connectivity datastore 134 for use in future matchmaking.

It should be noted that some of the operations of method 200 may be performed out of the order presented, with additional elements, and/or without some elements. Some of the operations of method 200 may further take place substantially concurrently and, therefore, may conclude in an order different from the order of operations shown above. Further, implementations are not limited to the details of the above examples and variations are possible.

Figure 3:
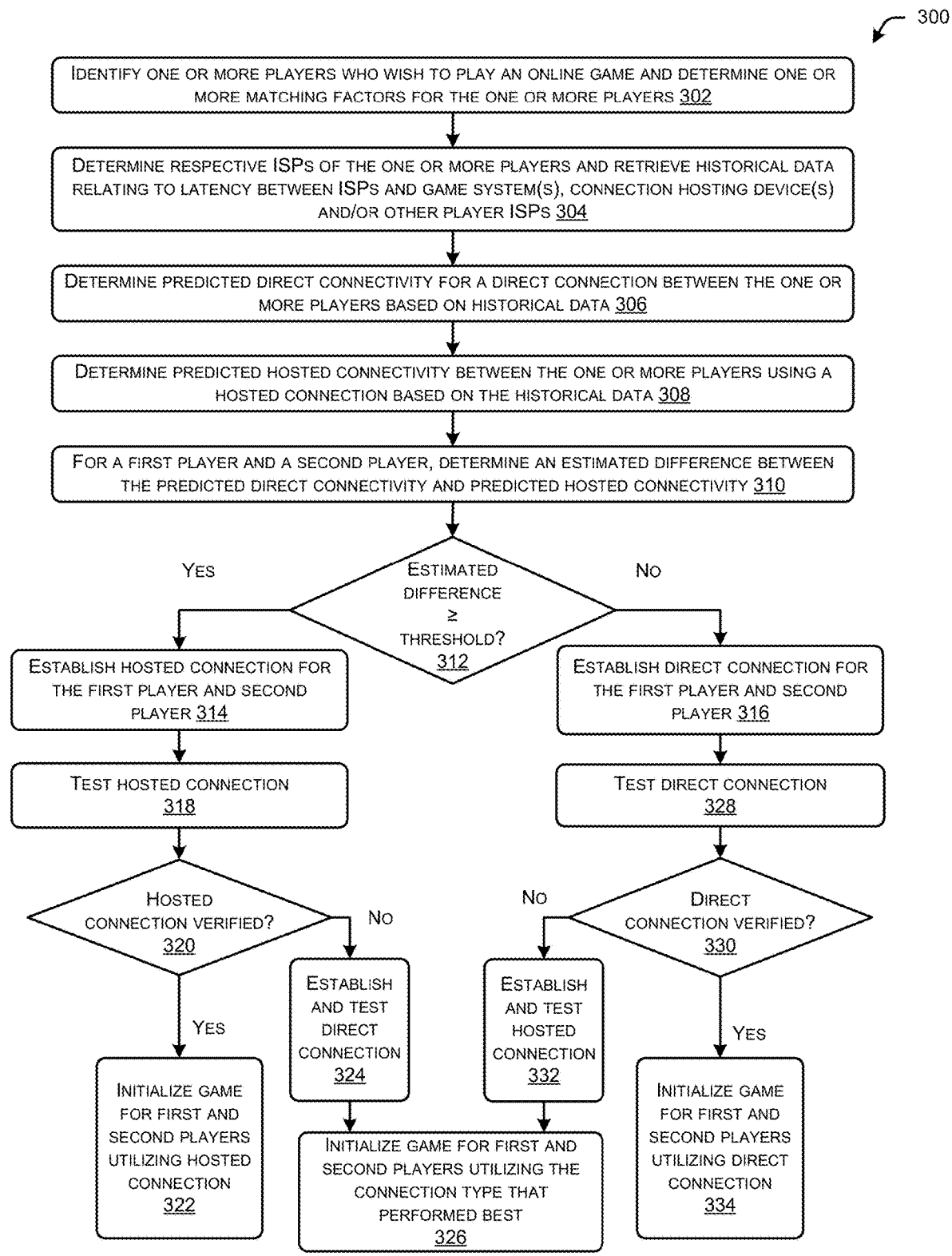
FIG. 3 illustrates a flow diagram of an example method that may preserve resources by predicting a benefit from utilizing a hosted connection between players, in accordance with example embodiments of the disclosure.

FIG. 3 illustrates a flow diagram of an example method 300 that may preserve resources by predicting a benefit from utilizing a hosted connection between players, in accordance with example embodiments of the disclosure. More particularly, the method 300 may use the privacy-compliant connectivity prediction discussed above to determine the predicted connectivity for a direct connection between game client devices and a predicted connectivity for a hosted connection between game client devices. If an expected improvement (e.g., the difference in predicted connectivity between the direct connection and the hosted connection) exceeds a predetermined threshold, the game client devices may be instructed to use a hosted connection 144 The method 300 may be performed by the matchmaking system(s) 130, individually or in cooperation with one or more other elements of the environment 100.

At block 302, the matchmaking system(s) 130 may identify one or more players who wish to play an online game and determine one or more matching factors for the one or more players. At block 304, the matchmaking system(s) 130 may determine respective player ISPs of the one or more players and retrieve historical data relating to latency between the player ISPs and the game system(s), connection hosting device(s) and/or other player ISPs.

The matchmaking system(s) 130 may then determine a predicted direct connectivity for a direct connection between the one or more players based on the retrieved historical data at block 306. At block 308, the matchmaking system(s) 130 may determine a predicted hosted connectivity between the one or more players using a hosted connection based on the retrieved historical data.

Then, at block 310, the matchmaking system(s) 130 may determine, for a first player and a second player, an estimated difference between the predicted direct connectivity between the first and second players and a predicted hosted connectivity between the first and second players. At block 312, the matchmaking system(s) 130 may determine whether the estimated difference is greater than or equal to a threshold. If so, the process may continue to block 314. Otherwise, the process continues to block 316.

At block 314, the matchmaking system(s) 130 may cause a hosted connection to be established between the first and second players (e.g., via the game system(s) 110 and/or connection hosting device(s) 140). The matchmaking system(s) 130 may then cause the hosted connection to be tested to verify the connection performs as predicted at 318. At 318, the matchmaking system(s) 130 may determine whether the hosted connection was verified to perform as predicted. If so, the process may continue to block 322 where the matchmaking system(s) 130 may cause the game to be initialized for the first and second players utilizing the hosted connection. Otherwise, the process may continue to block 324.

At block 324, the matchmaking system(s) 130 may cause a direct connection to be established between the first and second players (e.g., via the player ISPs of the first and second players). The matchmaking system(s) 130 may also cause the direct connection to be tested to verify the connection performs as predicted. At block 326, the matchmaking system(s) 130 may cause the game to be initialized for the first and second players the utilizing the connection type that performed best. For example, if the direct connection ultimately performed worse than the hosted connection, the matchmaking system(s) 130 may also cause the game to be initialized for the first and second players the utilizing a hosted connection.

Returning to block 316, the matchmaking system(s) 130 may cause a direct connection to be established between the first and second players (e.g., via the player ISPs of the first and second players). The matchmaking system(s) 130 may then cause the direct connection to be tested to verify the connection performs as predicted at 328. At 330, the matchmaking system(s) 130 may determine whether the direct connection was verified to perform as predicted. If so, the process may continue to block 334 where the matchmaking system(s) 130 may cause the game to be initialized for the first and second players utilizing the direct connection. Otherwise, the process may continue to block 332.

At block 332, the matchmaking system(s) 130 may cause a hosted connection to be established between the first and second players (e.g., via the game system(s) 110 and/or connection hosting device(s) 140). The matchmaking system(s) 130 may also cause the hosted connection to be tested to verify the connection performs as predicted. The process may then continue to block 326 as discussed above.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 4:
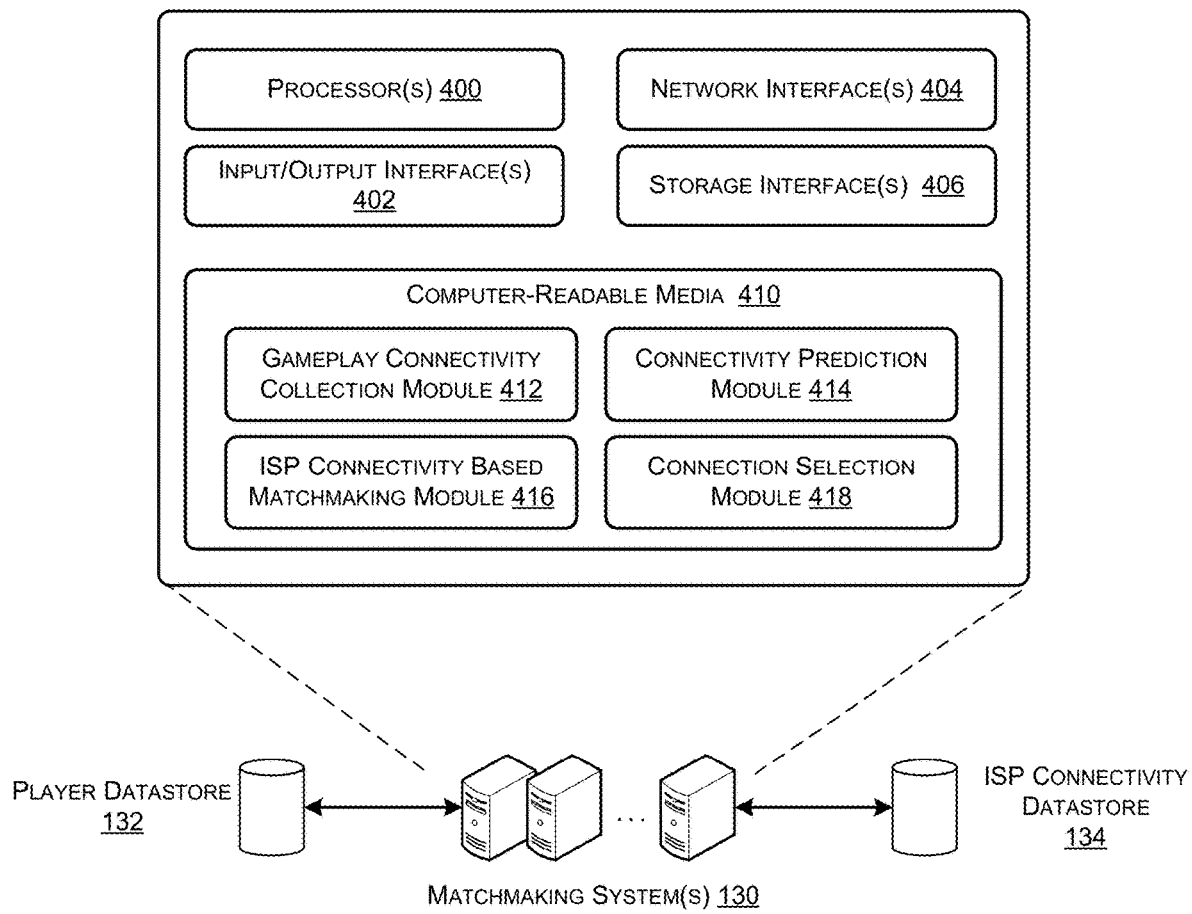
FIG. 4 illustrates a block diagram of example matchmaking system(s) that may provide matchmaking for online games, in accordance with example embodiments of the disclosure.

FIG. 4 illustrates a block diagram of example matchmaking system(s) 130 that may provide matchmaking for online games, in accordance with example embodiments of the disclosure. The matchmaking system(s) 130 may include one or more processor(s) 400, one or more input/output (I/O) interface(s) 402, one or more network interface(s) 404, one or more storage interface(s) 406, and computer-readable media 410.

In some implementations, the processors(s) 400 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASIC s), application-specific standard products (ASSPs), system-on-a-chip system(s) (SOCs), complex programmable logic devices (CPLDs), etc. Additionally, each of the processor(s) 400 may possess its own local memory, which also may store program modules, program data, and/or one or more operating system(s). The one or more processor(s) 400 may include one or more cores.

The one or more input/output (I/O) interface(s) 402 may enable the matchmaking system(s) 130 to detect interaction with a user and/or other system(s), such as one or more game system(s) 110. The I/O interface(s) 402 may include a combination of hardware, software, and/or firmware and may include software drivers for enabling the operation of any variety of I/O device(s) integrated on the matchmaking system(s) 130 or with which the matchmaking system(s) 130 interacts, such as displays, microphones, speakers, cameras, switches, and any other variety of sensors, or the like.

The network interface(s) 404 may enable the matchmaking system(s) 130 to communicate via the one or more network(s). The network interface(s) 404 may include a combination of hardware, software, and/or firmware and may include software drivers for enabling any variety of protocol-based communications, and any variety of wireline and/or wireless ports/antennas. For example, the network interface(s) 404 may comprise one or more of a cellular radio, a wireless (e.g., IEEE 402.1x-based) interface, a Bluetooth® interface, and the like. In some embodiments, the network interface(s) 404 may include radio frequency (RF) circuitry that allows the matchmaking system(s) 130 to transition between various standards. The network interface(s) 404 may further enable the matchmaking system(s) 130 to communicate over circuit-switch domains and/or packet-switch domains.

The storage interface(s) 406 may enable the processor(s) 400 to interface and exchange data with the computer-readable medium 410, as well as any storage device(s) external to the matchmaking system(s) 130, such as the player datastore 132 and ISP connectivity datastore 134.

The computer-readable media 410 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 410 may be implemented as computer-readable storage media (CRSM), which may be any available physical media accessible by the processor(s) 400 to execute instructions stored on the computer readable media 410. In one basic implementation, CRSM may include RAM and Flash memory. In other implementations, CRSM may include, but is not limited to, ROM, EEPROM, or any other tangible medium which can be used to store the desired information and which can be accessed by the processor(s) 400. The computer-readable media 410 may have an operating system (OS) and/or a variety of suitable applications stored thereon. The OS, when executed by the processor(s) 400 may enable management of hardware and/or software resources of the matchmaking system(s) 130.

Several functional blocks having instruction, data stores, and so forth may be stored within the computer-readable media 410 and configured to execute on the processor(s) 400. The computer readable media 410 may have stored thereon a gameplay connectivity collection module block 412, a connectivity prediction module block 414, ISP connectivity based matchmaking module block 416, and a connection selection module block 418. It will be appreciated that each of the functional blocks 412, 414, 416, and 418 may have instructions stored thereon that when executed by the processor(s) 400 may enable various functions pertaining to the operations of the matchmaking system(s) 130.

The instructions stored in the gameplay connectivity collection module block 412, when executed by the processor(s) 400, may configure the matchmaking system(s) 130 to request and/or collect network connection data such as latency information for players during gameplay or other interactions and to determine and store historical data on connectivity (e.g., latency) between player ISPs and game systems (e.g., datacenters of the game system(s) 110), connection hosting devices 140 and/or other ISPs in the ISP connectivity datastore 134 as discussed above regarding FIGS. 1-3.

The instructions stored in the connectivity prediction module block 414, when executed by the processor(s) 400, may configure the matchmaking system(s) 130 to utilize the historical data on connectivity (e.g., latency) between player ISPs with game systems (e.g., datacenters of the game system(s) 110), connection hosting devices 140 and/or other ISPs in the ISP connectivity datastore 134, along with other information such as the players internal ISP latencies to determine predicted connectivity data for use in matchmaking as discussed above regarding FIGS. 1-3.

The instructions stored in the ISP connectivity based matchmaking module block 416, when executed by the processor(s) 400, may configure the matchmaking system(s) 130 to perform matching of the players based on the predicted connectivity data and/or other matching factors as discussed above with regard to FIGS. 1-3.

The instructions stored in the connection selection module block 418, when executed by the processor(s) 400, may configure the matchmaking system(s) 130 to preserve system resources by predicting a benefit from utilizing a hosted connection between players and utilizing the hosted connection when an expected improvement (e.g., the difference in predicted connectivity between the direct connection 142 and the hosted connection 144) exceeds a predetermined threshold.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to:
receive historical data relating to network connections between a first respective internet service provider (ISP) of a first device of a first player and one or more of a hosting system or a second respective ISP of a second device of a second player;
determine, based at least in part on the historical data, a predicted connectivity between one or more of:
the first respective ISP and the second respective ISP;
the first respective ISP and the hosting system; or
the second respective ISP and the hosting system; and
based at least in part on the predicted connectivity, instantiate an online game between at least the first device of the first player and the second device of the second player.

2. The system of claim 1, wherein:
the historical data is received from a datastore; and
the computer-executable instructions further cause the one or more processors to:
collect, during the online game, network connection data regarding a network connection between the first device of the first player and the second device of the second player;
determine, based at least in part on the network connection data collected during the online game, additional historical data relating to the network connection between one or more of:
the first respective ISP and the second respective ISP;
the first respective ISP and the hosting system; or
the second respective ISP and the hosting system; and
update the historical data in the datastore based at least in part on the additional historical data.

3. The system of claim 1, wherein the computer-executable instructions further cause the one or more processors to:
determine a matching factor for the first device of the first player and the second device of the second player, the matching factor being at least partially representative of a first skill level of the first player and a second skill level of the second player; and
wherein to instantiate the online game between at least the first device of the first player and the second device of the second player based at least in part on the predicted connectivity, the computer-executable instructions further cause the one or more processors to:
determine the first device of the first player matches with the second device of the second player based at least in part on the matching factor and the predicted connectivity.

4. The system of claim 1, wherein the computer-executable instructions further cause the one or more processors to:
receive other historical data relating to other network connections between the first respective ISP and a third respective ISP of a third device of a third player; and
determine, based at least in part on the other historical data, another predicted connectivity between the first respective ISP and the third respective ISP;
wherein to instantiate the online game between at least the first device of the first player and the second device of the second player based at least in part on the predicted connectivity, the computer-executable instructions further cause the one or more processors to:
determine that the predicted connectivity meets a threshold;
determine that the another predicted connectivity does not meet the threshold;
determine the first device of the first player matches with the second device of the second player based at least in part on the predicted connectivity meeting the threshold; and
determine the first device of the first player does not match with the third device of the third player based at least in part on the another predicted connectivity not meeting the threshold.

5. The system of claim 1, wherein to instantiate the online game between at least the first device of the first player and the second device of the second player based at least in part on the predicted connectivity, the computer-executable instructions further cause the one or more processors to:
determine an estimated difference between the predicted connectivity between the first respective ISP and the second respective ISP and a predicted hosted connectivity based at least in part on the predicted connectivity between the first respective ISP and the hosting system and the predicted connectivity between the second respective ISP and the hosting system;
determine the estimated difference is greater than or equal to a threshold; and
instantiate, based at least in part on the estimated difference being greater than or equal to the threshold, the online game based at least in part on a hosted connection comprising a first connection between the first respective ISP and the hosting system and a second connection between the second respective ISP and the hosting system.

6. The system of claim 1, wherein the predicted connectivity between the one or more of the first respective ISP and the second respective ISP, the first respective ISP and the hosting system, or the second respective ISP and the hosting system is one or more of a predicted latency between the first respective ISP and the second respective ISP, a predicted latency between the first respective ISP and the hosting system, or a predicted latency between the second respective ISP and the hosting system.

7. A computer-implemented method comprising:
receiving historical data relating to network connections between a first respective internet service provider (ISP) of a first device of a first player and one or more of a hosting system or a second respective ISP of a second device of a second player;
determining, based at least in part on the historical data, a predicted connectivity between one or more of:
the first respective ISP and the second respective ISP;
the first respective ISP and the hosting system; or
the second respective ISP and the hosting system; and
based at least in part on the predicted connectivity, instantiating an online game between at least the first device of the first player and the second device of the second player.

8. The computer-implemented method of claim 7, wherein:
the historical data is received from a datastore; and
the method further comprises:
collecting, during the online game, network connection data regarding a network connection between the first device of the first player and the second device of the second player;
determining, based at least in part on the network connection data collected during the online game, additional historical data relating to the network connection between:
the first respective ISP and the second respective ISP;
the first respective ISP and the hosting system; or
the second respective ISP and the hosting system; and
updating the historical data in the datastore based at least in part on the additional historical data.

9. The computer-implemented method of claim 7, further comprising:
determining a matching factor for the first device of the first player and the second device of the second player, the matching factor being at least partially representative of a first skill level of the first player and a second skill level of the second player; and
wherein instantiating the online game between at least the first device of the first player and the second device of the second player based at least in part on the predicted connectivity comprises:
determining the first device of the first player matches with the second device of the second player based at least in part on the matching factor and the predicted connectivity.

10. The computer-implemented method of claim 7, further comprising:
receiving other historical data relating to other network connections between the first respective ISP and a third respective ISP of a third device of a third player; and determining, based at least in part on the other historical data, another predicted connectivity between the first respective ISP and the third respective ISP;
wherein instantiating the online game between at least the first device of the first player and the second device of the second player based at least in part on the predicted connectivity comprises:
determining that the predicted connectivity meets a threshold;
determining that the another predicted connectivity does not meet the threshold;
determining the first device of the first player matches with the second device of the second player based at least in part on the predicted connectivity meeting the threshold; and
determining the first device of the first player does not match with the third device of the third player based at least in part on the another predicted connectivity not meeting the threshold.

11. The computer-implemented method of claim 7, wherein instantiating the online game between at least the first device of the first player and the second device of the second player based at least in part on the predicted connectivity comprises:
determining an estimated difference between the predicted connectivity between the first respective ISP and the second respective ISP and a predicted hosted connectivity based at least in part on the predicted connectivity between the first respective ISP and the hosting system and the predicted connectivity between the second respective ISP and the hosting system; and
determining the estimated difference is greater than or equal to a threshold; and
instantiating, based at least in part on the estimated difference being greater than or equal to the threshold, the online game based at least in part on a hosted connection comprising a first connection between the first respective ISP and the hosting system and a second connection between the second respective ISP and the hosting system.

12. The computer-implemented method of claim 7, wherein the predicted connectivity between the one or more of the first respective ISP and the second respective ISP, the first respective ISP and the hosting system, or the second respective ISP and the hosting system is one or more of a predicted latency between the first respective ISP and the second respective ISP, a predicted latency between the first respective ISP and the hosting system, or a predicted latency between the second respective ISP and the hosting system.

13. The computer-implemented method of claim 7, wherein the predicted connectivity between the one or more of the first respective ISP and the second respective ISP is associated with at least one network connection terminating at a first device of a first network infrastructure of the first respective ISP and terminating at a second device of a second network infrastructure of the second respective ISP.

14. One or more non-transitory computer-readable media storing computer-executable instructions that, when executed, cause one or more processors to:
receive historical data relating to network connections between a first respective internet service provider (ISP) of a first device of a first player and one or more of a hosting system or a second respective ISP of a second device of a second player;
determine, based at least in part on the historical data, a predicted connectivity between one or more of:

the first respective ISP and the second respective ISP;
the first respective ISP and the hosting system; or
the second respective ISP and the hosting system; and
based at least in part on the predicted connectivity, instantiate an online game between at least the first device of the first player and the second device of the second player.

15. The one or more non-transitory computer-readable media of claim 14, wherein:
the historical data is received from a datastore; and
the computer-executable instructions further cause the one or more processors to:
collect, during the online game, network connection data regarding a network connection between the first device of the first player and the second device of the second player;
determine, based at least in part on the network connection data collected during the online game, additional historical data relating to the network connection between:
the first respective ISP and the second respective ISP;
the first respective ISP and the hosting system; or
the second respective ISP and the hosting system; and
update the historical data in the datastore based at least in part on the additional historical data.

16. The one or more non-transitory computer-readable media of claim 14, wherein the computer-executable instructions further cause the one or more processors to:
determine a matching factor for the first device of the first player and the second device of the second player, the matching factor being at least partially representative of a first skill level of the first player and a second skill level of the second player; and
wherein to instantiate the online game between at least the first device of the first player and the second device of the second player based at least in part on the predicted connectivity, the computer-executable instructions further cause the one or more processors to:
determine the first device of the first player matches with the second device of the second player based at least in part on the matching factor and the predicted connectivity.

17. The one or more non-transitory computer-readable media of claim 14, wherein the computer-executable instructions further cause the one or more processors to:
receive other historical data relating to other network connections between the first respective ISP and a third respective ISP of a third device of a third player; and
determine, based at least in part on the other historical data, another predicted connectivity between the first respective ISP and the third respective ISP;
wherein to instantiate the online game between at least the first device of the first player and the second device of the second player based at least in part on the predicted connectivity, the computer-executable instructions further cause the one or more processors to:
determine that the predicted connectivity meets a threshold;
determine that the another predicted connectivity does not meet the threshold;
determine the first device of the first player matches with the second device of the second player based at least in part on the predicted connectivity meeting the threshold; and
determine the first device of the first player does not match with the third device of the third player based at least in part on the another predicted connectivity not meeting the threshold.

18. The one or more non-transitory computer-readable media of claim 14, wherein to instantiate the online game between at least the first device of the first player and the second device of the second player based at least in part on the predicted connectivity, the computer-executable instructions further cause the one or more processors to:
determine an estimated difference between the predicted connectivity between the first respective ISP and the second respective ISP and a predicted hosted connectivity based at least in part on the predicted connectivity between the first respective ISP and the hosting system and the predicted connectivity between the second respective ISP and the hosting system;
determine the estimated difference is greater than or equal to a threshold; and
instantiate, based at least in part on the estimated difference being greater than or equal to the threshold, the online game based at least in part on a hosted connection comprising a first connection between the first respective ISP and the hosting system and a second connection between the second respective ISP and the hosting system.

19. The one or more non-transitory computer-readable media of claim 14, wherein the predicted connectivity between the one or more of the first respective ISP and the second respective ISP, the first respective ISP and the hosting system, or the second respective ISP and the hosting system is one or more of a predicted latency between the first respective ISP and the second respective ISP, a predicted latency between the first respective ISP and the hosting system, or a predicted latency between the second respective ISP and the hosting system.

20. The one or more non-transitory computer-readable media of claim 14, wherein the predicted connectivity between the one or more of the first respective ISP and the second respective ISP is associated with at least one network connection terminating at a first device of a first network infrastructure of the first respective ISP and terminating at a second device of a second network infrastructure of the second respective ISP.

\* \* \* \* \*